Aug. 6, 1940.  C. VOGEL  2,210,694
BRAKING SYSTEM FOR ELECTRIC TRAINS
Filed Oct. 29, 1938
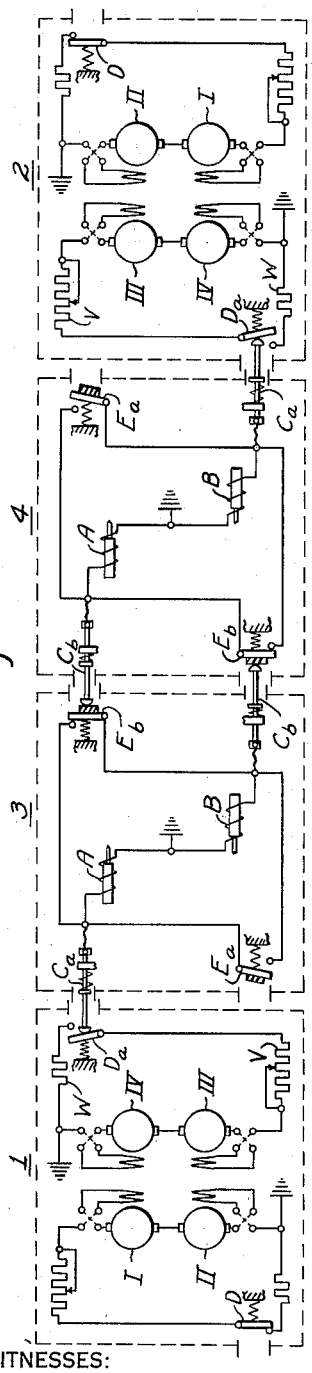
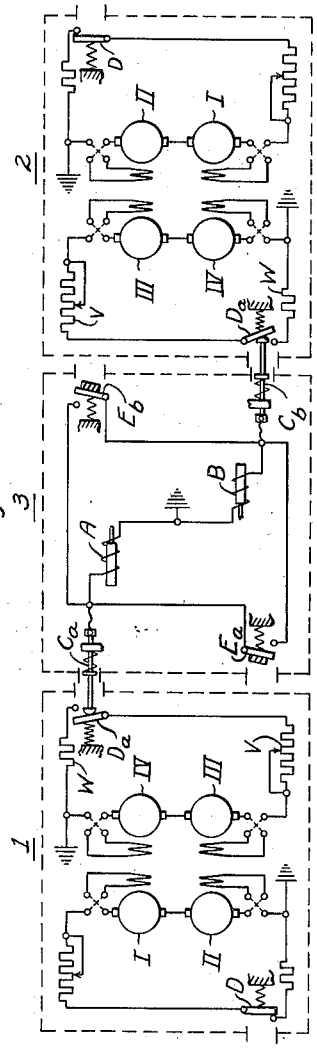
WITNESSES:
*James F. Young*
*W. E. Elliott*
INVENTOR
*Carl Vogel.*
BY *J. M. Crawford*
ATTORNEY Patented Aug. 6, 1940

2,210,694

UNITED STATES PATENT OFFICE 2,210,694

BRAKING SYSTEM FOR ELECTRIC TRAINS

Carl Vogel, Berlin-Schoneberg, Germany, assignor to Westinghouse Electric & Manufacturing Company, East Pittsburgh, Pa., a corporation of Pennsylvania Application October 29, 1938, Serial No. 237,727
In Germany February 1, 1938

4 Claims. (Cl. 188—159)

The invention relates to electrically driven trains with driving vehicles and accessory vehicles in which the motors are used for braking on the driving vehicles, while magnetic brakes are used on the accessory vehicles. The expediency of connecting the magnetic brakes of the accessory vehicles to the motors of the driving vehicles so that the short circuit braking current of the motors may serve simultaneously for exciting the magnetic brakes is already known.

The object of the invention is to provide switching devices which are automatically actuated when the vehicles are coupled together to establish the braking circuits of the driving vehicles and the energizing circuits for the magnetic brakes of the accessory vehicles.

In accordance with the invention, switching elements, which become effective when the coupling takes place, are added to the driving vehicles and the accessory vehicles for the attainment of the desired changeover in the circuit connections, and these switching elements function upon the coupling of an accessory vehicle with a driving vehicle to connect the motors of the driving vehicle to at least one of the magnetic brakes of the accessory vehicle, while on the coupling of two accessory vehicles they function to connect in parallel a plurality of magnetic brakes in each accessory vehicle. In this case the switching elements are actuated in such a manner that the braking circuits of the two accessory vehicles remain independent of each other. The above mentioned switching elements consist of couplers or switching bars which cooperate with switches disposed adjacent thereto.

In the following, the invention will be explained more in detail with an exemplary embodiment shown in Fig. 1, which relates to an arrangement with two driving vehicles and two accessory vehicles which run between the two driving vehicles, and Fig. 2, in which one accessory vehicle is shown coupled between two driving vehicles.

Referring to the drawing, the numerals I and II or III and IV identify the four motors of the driving vehicles which serve during the braking operation for braking the driving vehicles. For simplicity the driving circuit is not illustrated. As shown, the motors are connected in series with each other in pairs of two each. It will first be assumed that the driving vehicles 1 or 2 are to be driven alone. In this case the braking circuits of the motor groups I and II or III and IV are closed through starting impedances V and through compensating impedances W. The braking circuit for each group of motors extends through the switches D or $D_a$. In this case the motors I and II or III and IV operate with closed circuit braking connections independently of each other.

If the driving vehicles 1 and 2 are coupled with the accessory vehicles 3 and 4, as shown in Fig. 1, in such manner that the two accessory vehicles are located between the two driving vehicles, the following changeover connections result: The switch $D_a$ on the driving vehicle 1 is interrupted by the neighboring coupling bar $C_a$ of the accessory vehicle 3. Since the coupling bar $C_a$ is so constructed that it is suitable for current conduction, a series connection between the motors III and IV and the magnetic brake A of the accessory vehicle 3 is established. Simultaneously, the circuit breaker $E_b$ in the accessory vehicle 3 is closed by a coupling bar $C_b$ of the accessory vehicle 4 so that the magnetic brake B is connected in parallel to the magnetic brake A.

In precisely the same manner the switch $D_a$ of the driving vehicle 2 is opened by the coupling bar $C_a$ of the accessory vehicle 4, thereby establishing a circuit for the motors III and IV of the driving vehicle 2 through the two brakes A and B of the accessory vehicle 4. Since the switch $E_b$ of the accessory vehicle 4 is closed by a coupling bar $C_b$ of the accessory vehicle 3 at this time, the magnetic brakes A and B are connected in parallel in the manner hereinbefore described.

The short circuit braking connections for the motors I and II of the two driving vehicles 1 and 2 remain unchanged at this time, since the switches D in the circuits of these motors remain unactuated. Also the switches $E_a$ of the two accessory vehicles 3 and 4 remain unactuated and opened, as shown.

If only a single accessory vehicle is used between two driving vehicles, as shown in Fig. 2, there results the simpler circuits, as illustrated therein, in which the two switches $D_a$ in the motor circuits of the two motors III and IV are interrupted on both driving vehicles by the coupling bars $C_a$ and $C_b$ of the accessory vehicle 3. In this manner the motors III and IV of the driving vehicle 1 are connected in series with the magnetic brake A and the motors III and IV of the driving vehicle 2 are connected in series with the magnetic brake B. Accordingly, in this connection, the two magnetic brakes of the accessory vehicles are energized by the motors of different driving vehicles.

It will be understood that the magnetic brakes on the accessory vehicles may be of any well known type, such as magnetic track brakes which are actuated to retard the movement of a vehicle upon the energization of a magnetizing coil. Furthermore, it will be understood that the switches $E_a$ and $E_b$ on the accessory vehicles may be so insulated from the conducting coupling bars, as shown, that no current will flow between the switches and the coupling bars when they are actuated by the coupling bars. Likewise, the switches $D_a$ may be so constructed that current will flow between the switch and the coupling bars when engaged by the coupling bars, thereby establishing the circuits hereinbefore described.

From the foregoing description, it is apparent that I have provided a braking system for electric vehicles in which the switching devices are automatically actuated upon the coupling of the vehicles in such a manner that the braking circuits may be established when desired.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A device for braking a plurality of accessory vehicles which run between two driving vehicles in an electrically driven train and are provided with magnetic brakes supplied by the motors of the driving vehicles comprising switching means disposed between the vehicles and actuated upon the coupling of the accessory vehicles with the driving vehicles to connect motors of the driving vehicles to magnetic brakes on the accessory vehicles, thereby energizing said magnetic brakes by current from said motors during braking of the vehicles, said switching means being disposed to connect a plurality of magnetic brakes on each accessory vehicle in parallel without producing a conductive connection between the magnetic brakes on different accessory vehicles.

2. In a device for braking a plurality of accessory vehicles which run between two driving vehicles in an electrically driven train and are provided with magnetic brakes supplied by the motors of the driving vehicles, in combination, a switch on each driving vehicle, a switch on each accessory vehicle, and current conducting coupling bars disposed to actuate said switches upon the coupling of the accessory vehicles with the driving vehicles, whereby the magnetic brakes are connected in parallel by the switches actuated by the coupling bars during the coupling of two accessory vehicles so that the magnetic brakes on each accessory vehicle are supplied in common by motors of a driving vehicle independently of the brakes on the other vehicles.

3. In a device for braking accessory vehicles which run between two driving vehicles in an electrically driven train and are provided with magnetic brakes supplied by the motors of the driving vehicles, in combination, a switch on each driving vehicle, a switch on each accessory vehicle, and current conducting coupling bars disposed to actuate said switches upon the coupling of the accessory vehicles with the driving vehicles, whereby the magnetic brakes are connected in parallel by the switches actuated by the coupling bars during the coupling of two accessory vehicles so that they are supplied in common by motors of a driving vehicle coupled with one of the accessory vehicles, said switches on the accessory vehicles for the parallel connection of the magnetic brakes being insulated from said current conducting coupling bars.

4. In a device for braking an accessory vehicle which runs between two driving vehicles in an electrically driven train and is provided with a pair of magnetic brakes supplied by the motors of the driving vehicles, in combination, a switch on each driving vehicle, and current conducting coupling bars disposed on the accessory vehicle to actuate said switches to connect one of the magnetic brakes of the accessory vehicle in series with a motor of the front driving vehicle, and to connect the other magnetic brake of the accessory vehicle in series with a motor of the rear driving vehicle.

CARL VOGEL.